United States Patent
Bergen

(10) Patent No.: US 11,353,368 B2
(45) Date of Patent: Jun. 7, 2022

(54) FIBER OPTIC PROBE WITH DUAL SEALING AND COMPRESSION ELEMENT

(71) Applicant: Watlow Electric Manufacturing Company, St. Louis, MO (US)

(72) Inventor: John Bergen, San Jose, CA (US)

(73) Assignee: Watlow Electric Manufacturing Company, St. Louis, MO (US)

(*) Notice: Subject to any disclaimer, the term of this patent is extended or adjusted under 35 U.S.C. 154(b) by 444 days.

(21) Appl. No.: 16/419,612

(22) Filed: May 22, 2019

(65) Prior Publication Data

US 2019/0360875 A1 Nov. 28, 2019

Related U.S. Application Data

(60) Provisional application No. 62/674,885, filed on May 22, 2018.

(51) Int. Cl.
*G01K 11/32* (2021.01)
*G01K 1/20* (2006.01)

(52) U.S. Cl.
CPC ............... *G01K 11/32* (2013.01); *G01K 1/20* (2013.01)

(58) Field of Classification Search
CPC .................................. G01K 11/32; G01K 1/20
See application file for complete search history.

(56) References Cited

U.S. PATENT DOCUMENTS

| | | | | |
|---|---|---|---|---|
| 5,876,119 A * | 3/1999 | Ishikawa | ................ | G01J 5/041 374/134 |
| 6,019,507 A * | 2/2000 | Takaki | ................ | G01K 11/18 374/161 |
| 6,190,040 B1 * | 2/2001 | Renken | ................ | G01K 1/026 374/133 |
| 6,257,758 B1 * | 7/2001 | Culbertson | ............ | G01K 1/143 374/120 |
| 6,481,886 B1 | 11/2002 | Narendrnath et al. | | |
| 7,060,949 B1 * | 6/2006 | Davis | ................ | G01K 7/22 219/536 |
| 9,464,350 B2 * | 10/2016 | Mullin | ................ | G01K 1/026 |
| 9,625,923 B2 * | 4/2017 | Bohlinger | .......... | G05D 23/1931 |
| 2003/0112848 A1 * | 6/2003 | Khan | ................ | G01K 11/3213 374/161 |

(Continued)

FOREIGN PATENT DOCUMENTS

| | | |
|---|---|---|
| EP | 0541438 | 5/1993 |
| TW | 459131 | 10/2001 |
| TW | I443324 | 7/2014 |

OTHER PUBLICATIONS

International Search Report for International Application PCT/US2019/033521, dated Sep. 17, 2019.

*Primary Examiner* — Nathaniel T Woodward
*Assistant Examiner* — Philip L Cotey
(74) *Attorney, Agent, or Firm* — Burris Law, PLLC

(57) ABSTRACT

Temperature sensing probes for sensing the temperature of a substrate based on fluorescence are disclosed. The temperature sensing probes include a fiber optic cable having at a cold end an optical interface and at a hot end a temperature sensing element for contacting a substrate. A sheath surrounds at least a portion of the hot end of the fiber optic cable. A retaining member securely and removably engages the sheath with a support member. The sheath forms a vacuum seal around the contact between the temperature sensing element and the substrate.

20 Claims, 3 Drawing Sheets

(56) References Cited

U.S. PATENT DOCUMENTS

| | | | |
|---|---|---|---|
| 2003/0209773 A1* | 11/2003 | Lue | G01K 11/3213 257/467 |
| 2004/0258130 A1* | 12/2004 | Gotthold | G01J 5/0205 374/208 |
| 2007/0223000 A1* | 9/2007 | Gahan | G01D 5/266 356/454 |
| 2008/0089001 A1* | 4/2008 | Parkhe | H01L 21/6831 361/234 |
| 2009/0000548 A1* | 1/2009 | Soh | C23C 14/541 118/712 |
| 2012/0244290 A1* | 9/2012 | Mullin | C23C 14/541 427/457 |
| 2013/0034122 A1* | 2/2013 | Lewis | G01K 11/3213 374/161 |
| 2014/0199490 A1* | 7/2014 | Mullin | C23C 14/541 427/458 |
| 2015/0289767 A1* | 10/2015 | Keller | G01K 11/3213 600/549 |
| 2016/0011060 A1* | 1/2016 | Bergen | G01K 11/32 219/444.1 |
| 2019/0187003 A1* | 6/2019 | Brunnett | G01K 1/10 |
| 2019/0360875 A1* | 11/2019 | Bergen | G01K 11/32 |
| 2021/0172806 A1* | 6/2021 | Jupudi | G01K 1/16 |

\* cited by examiner

FIBER OPTIC PROBE WITH DUAL SEALING AND COMPRESSION ELEMENT

CROSS-REFERENCE TO RELATED APPLICATIONS

This application claims priority to and the benefit of U.S. Provisional Application No. 62/674,885, filed on May 22, 2018. The disclosure of the above application is incorporated herein by reference.

FIELD

The present disclosure relates generally to optical sensing, and more particularly to methods of mounting optical sensors in sealed environments.

BACKGROUND

The statements in this section merely provide background information related to the present disclosure and may not constitute prior art.

Temperature sensing probes, such as thermistors, resistance temperature detectors (RTDs), and resistance thermometers are used in a diverse array of applications to provide temperature feedback of various substrates. Such probes may be used in industrial processes, for example, and may be further in electrical connection with a controller that adjusts the temperature of a system as warranted in response to a temperature sensed by a temperature sensing probe.

In such environments, the end of a temperature sensing probe that detects temperature is commonly referred to as a hot end. What is commonly referred to as a cold end is generally the portion of the temperature sensing probe that is used to mechanically mount the temperature sensing probe to a fixed member. The cold end may or may not be actually inserted into a substrate and/or opening through which the probe is mounted. Furthermore, the cold end provides an electrical interface to a remote device, such as a controller or temperature readout. As noted above, the controller may further control the temperature in the system, providing a predetermined temperature profile in the system during processing, ensuring the temperature during processing is following the predetermined profile, or the like.

One such group of temperature sensing probes are fiber optic sensors. Such probes are based on the fluorescence decay time of a fluorescent sensor, which is typically located at the end of a fiber optic cable. Fiber optic sensor temperature sensing probes consistently and reliably measure temperatures accurately even in environments having elevated radio frequency activity, microwave radiation, and/or high voltage. Consequently, fiber optic sensor temperature sensing probes are often used in connection with semiconductor applications, where semiconductor substrates are processed into at least a semiconductor wafer. In many such semiconductor applications, a susceptor, an electrostatic chuck, or other support member is used to hold at least a semiconductor substrate in place while manufacturing semiconductor wafers. And many such support members further have incorporated within them apertures, commonly referred to as vias, wherein fiber optic sensor temperature sensing probes are disposed to more accurately and reliably measure the temperature of the semiconductor substrate during processing, thereby ensuring that resultant semiconductor wafers are processed at acceptable temperatures.

Mounting fiber optic sensor temperature probes can be challenging, especially considering the operating temperatures, pressures, and environment, along with other systems disposed within semiconductor processing equipment. These challenges with reliably mounting devices such as fiber optic sensor temperature probes within a variety of operational environments is addressed by the present disclosure.

SUMMARY

According to one form of the present disclosure, a temperature sensing probe comprises a fiber optic cable having at a cold end an optical interface and at a hot end a temperature sensing element. The temperature sensing element is for contacting a substrate, and the temperature sensing element comprises a fluorescent compound. A sheath surrounds at least a portion of the hot end of the fiber optic cable. A retaining member securely and removably engages the sheath with a support member, and a vacuum seal is provided between the temperature sensing element and the substrate.

According to other forms, a light detector is in optical communication with the optical interface.

In yet other forms, a light source is in optical communication with the optical interface.

In further forms, the temperature sensing probe further includes a controller comprising a light detector in optical communication with the optical interface and a light source in optical communication with the optical interface. The controller is configured to control the temperature of the substrate.

According to yet other forms, the sheath comprises silicone.

In other forms, the temperature sensing probe senses the temperature of a substrate in a vacuum.

In even further forms, the temperature sensing probe senses the temperature of a substrate in a cryogenic environment.

In yet other forms, the support member is an electrostatic chuck for use in semiconductor processing.

According to a form, a temperature sensing probe comprises a fiber optic cable having at a cold end an optical interface and at a hot end a temperature sensing element. The temperature sensing element is for contacting a substrate, and the substrate comprises a fluorescent compound. A sheath surrounds at least a portion of the hot end of the fiber optic cable. A light detector is in optical communication with the optical interface, and a light source is in optical communication with the optical interface. A retaining member securely and removably engages the sheath with a support member, and a vacuum seal is provided between the sheath and the substrate.

In further forms, the temperature sensing probe further includes a controller comprising a light detector in optical communication with the optical interface and a light source in optical communication with the optical interface. The controller is configured to control the temperature of the substrate.

According to yet other forms, the sheath comprises silicone.

In other forms, the temperature sensing probe senses the temperature of a substrate in a vacuum.

In even further forms, the temperature sensing probe senses the temperature of a substrate in a cryogenic environment.

In yet other forms, the support member is an electrostatic chuck for use in semiconductor processing.

According to a form, an assembly includes a support member comprising a via. A substrate is disposed adjacent to the support member. A fiber optic cable has at a cold end an optical interface and at a hot end a temperature sensing element. The temperature sensing element contacts the substrate. At least a portion of the hot end of the fiber optic cable is surrounded by a sheath, and at least a portion of the sheath is disposed in the via. A retaining member securely and removably engages the sheath within the support member. A vacuum seal is provided between the sheath and the substrate.

In yet other forms, the temperature sensing element comprises a fluorescent material.

In further forms, the substrate comprises a fluorescent material at the location of the vacuum seal.

In yet further forms, a controller comprises a light detector in optical communication with the optical interface and a light source in optical communication with the optical interface. The controller is configured to control the temperature of the substrate.

According to yet other forms, the sheath comprises silicone.

In other forms, the temperature sensing probe senses the temperature of a substrate in a vacuum.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
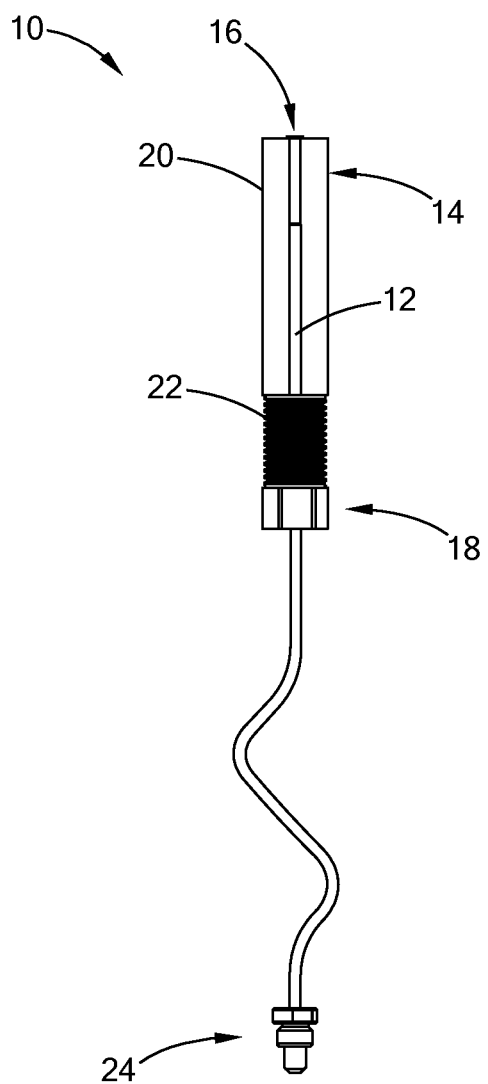
FIG. 1 is a front view of an optical sensor according to the present disclosure showing the sheath of the optical sensor as transparent for purposes of viewing internal components of the optical sensor.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Generally, with fiber optic sensing, fluorescence is the slow release of energy, in the form of light, by a material following its exposure to shorter, higher energy wavelengths. Fluorescent temperature sensing is based on the principle that the rate of energy released is dependent on the temperature of the fluorescing material. This time-dependent behavior, when properly measured, calibrated and controlled, can be used to accurately and repeatedly measure temperature.

As used herein, the term "optical sensor" should be construed to mean both a fiber optic light guide and an optical signal conditioner used to sense and determine temperature of a fluorescent material.

Referring to FIG. 1, a temperature sensing probe 10 in accordance with a first form of the present disclosure is illustrated. Temperature sensing probe 10 includes a fiber optic cable 12 around which a generally tubular sheath 20 is disposed. Although the sheath 20 is shown as tubular in this form, the sheath 20 may take on a number of geometries such as square or polygonal, among others, while remaining within the scope of the present disclosure.

One end of temperature sensing probe 10 may be referred to as a hot end 14, which typically is inserted into a via (as described below) of a support member (such as a susceptor or an electrostatic chuck). A temperature sensing element 16 is disposed on hot end 14 of fiber optic cable 12 for sensing the temperature of a substrate. As described below, temperature sensing element 16 generally comprises a fluorescent compound. The other end of temperature sensing probe 10, which may be referred to as a cold end 18, can optionally be mounted to a fixed structure. By way of nonlimiting example, such mountings may comprise rubber grommets, compression fittings, welded fittings, and the like, which may be mechanically attached to the fixed structure.

Temperature sensing probe 10 further includes a retaining element 22 that may be used to secure temperature sensing probe 10 into the via of a support member, thereby removably but securely connecting temperature sensing probe 10 within a corresponding via of the support member. Suitable retaining elements include thread and nut assemblies and any other assembly that removably but securely connects a temperature sensing probe within a support member. In this form, the retaining element 22 is an externally threaded nut. In one form, retaining element 22 when in removable but secured connection is configured to exert a force on temperature sensing probe 10 sufficient to cause elastic deformation of sheath 20 at or near the hot end 14 of temperature sensing probe 10 so that a substantially impervious, vacuum sealed contact is formed between temperature sensing element 16 of temperature sensing probe 10 and a substrate. With the elastic deformation of the sheath 20, a seal is formed between the sheath 20 and its surrounding environment, such as a via as illustrated and described below, in addition to providing axial compression to the temperature sensing element 16 for improved surface-to-surface contact, and thus a more accurate temperature reading. In this fashion, a robust connection is formed between temperature sensing element 16 and a substrate, which provides protection against low pressure environments externally, vacuum environment, substantial temperature fluctuations, and low temperature environments.

As further shown, an optical interface 24 is provided for connecting temperature sensing probe 10 to remotely mounted equipment, such as a temperature controller, and/or a temperature display, by way of nonlimiting example. Optical interface 24 is further in optical connection with an optical sensor and an optical source. Optical interface 24 is optically connected with fiber optic cable 12. Optical interface 24 may be electrically connected with fiber optic cable 12. Retaining element 22 may include an open core portion or portions (e.g., through holes along a longitudinal axis of retaining element 22) through which fiber optic cable 12 passes and traverses through to optical interface 24. In this manner, temperature sensing element 16 is optically connected (and may be electrically connected) with optical interface 24.

Figure 2:
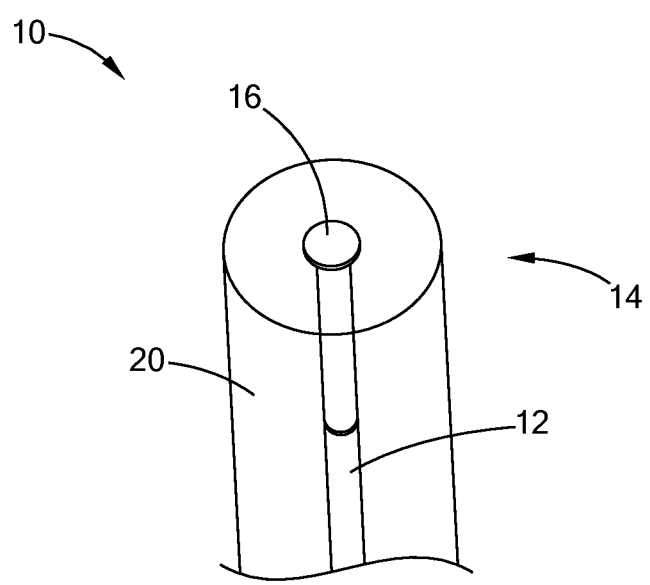
FIG. 2 is an enlarged perspective end view of the optical sensor according to the present disclosure.

Referring again to FIG. 1 and with reference to FIG. 2, the sheath 20 is disposed around the portion of fiber optic cable 12 hot end 14 of temperature sensing probe 10. In one form, the sheath 20 comprises a silicone material, and, as discussed further below, is elastically deformable through the application of axial compression from the retaining element 22. Accordingly, the sheath 20 provides a dual function of a seal and a compression element for improved accuracy of temperature readings, namely, by providing improved contact between the temperature sensing element 16 and an adjacent surface. According to an aspect, the silicone material exhibits at least one of the characteristics of being low outgassing, being highly compressible, and having a large thermally operable range. A silicone material that exhibits these characteristics is Nusil CV1-1142-4, commercially available from NuSil Technology.

Temperature sensing element 16 is at least partially surrounded by sheath 20 and may be at least partially housed within sheath 20. Temperature sensing element 16 typically resides adjacent hot end 14 of temperature sensing probe 10. Temperature sensing element 16 provides signals indicative of the temperature at hot end 14 of temperature sensing probe 10. According to an aspect, temperature sensing element 16 is comprised of a thermal sensing material. According to yet other aspects, in operation, temperature sensing element 16 is depressed against a substrate comprised of a thermal sensing material so that, as described below, a system in which a thermal sensing probe (such as thermal sensing probe 10) is used can accurately measure the temperature of the substrate. In one form the thermal sensing material comprises a fluorescent compound so that, as described below, a system in which a thermal sensing probe (such as thermal sensing probe 10) is used can accurately measure the temperature of a substrate. In many cases, appropriate fluorescent compounds are those that convert light directed from a light source to a different wavelength (e.g., upconverts or downconverts the light wavelength) and reflect that converted light back to a sensor that senses the reflected light. In many aspects, the fluorescent material is generally any species, such as molecular species and atomic species, that can be excited by photon absorption, from its ground state to one of the various vibrational states in the excited electronic state. The species then loses that vibrational energy, emitting a photon in the process. Examples of suitable fluorescent materials include, by way of non-limiting example, those that exhibit absorption bands between about 350 nm to about 550 nm, and excitation bands between about 550 nm to about 100 nm with strong decay dependence on temperature over the required temperature range of the application. Materials selected with shorter decay time constants at a given temperature may enable faster update rates. Various other materials may be employed and may be selected based on their application suitability for temperature range, fluorescent decay rate, cost, and commercial availability. Similarly, a sensor for measuring light converted by the fluorescent compound may be limited to measuring light wavelengths of about the light wavelength converted by the fluorescent compound, thereby preventing inaccurate measures of the light not converted but reflected back into the sensor. In such applications, atomic species type fluorescent is not as efficient, as atomic fluorescence photons are emitted at wavelengths during decay at substantially similar to identical wavelengths that are used for causing the vibrational level of the atomic species type used.

When a substrate comprised of a fluorescent material is contemplated, the substrate (such as, described below, substrate 34) may be comprised of a fluorescent material disposed within an optically clear matrix in a location where temperature sensing element 16 may optically sense the temperature of the substrate. The matrix may be a bonding material of the substrate, if warranted; the fluorescent material and matrix may be mixed in a bonding material, if warranted; and/or, the fluorescent material may be mixed in or separate from any matrix (if any). Accordingly, the specific disclosure should be considered as merely illustrative and should not be construed as limiting the scope of the present disclosure. The process of mixing the fluorescent material into the substrate is dependent on whether the fluorescent material will be disposed only in a portion of the substrate or the entirety of the substrate. For example, it may be desirable to mix the fluorescent material only into portions of the substrate that will be exposed to temperature sensing element 16. Optionally, fluorescent material can be mixed into or applied over locations of the substrate after the substrate is formed.

Figure 3:
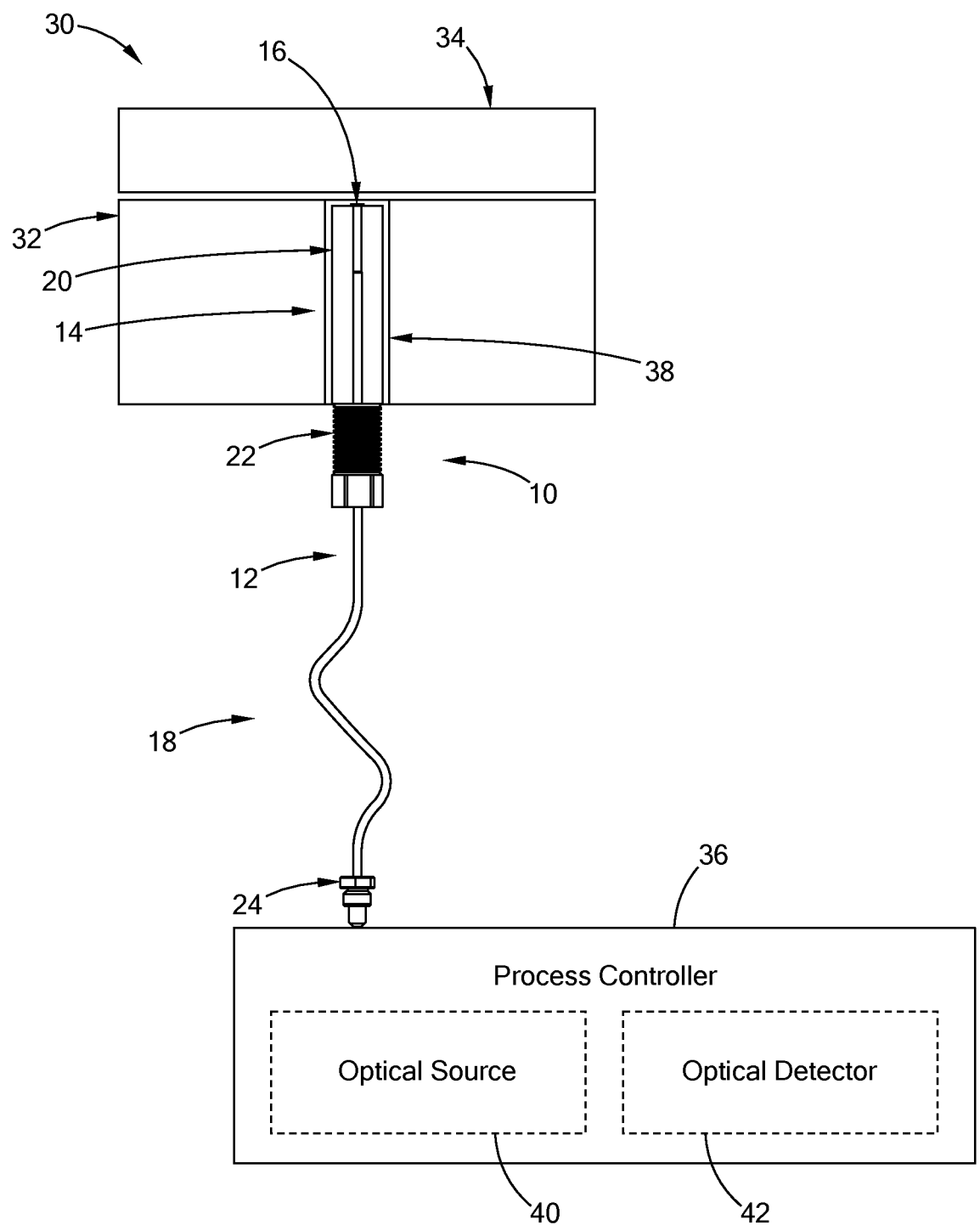
FIG. 3 is a cross-sectional side view of an assembly, showing a substrate, electrostatic chuck, and an optical sensor constructed according to the present disclosure.

Referring now to FIG. 3, an assembly 30 comprising temperature sensing probe 10 is illustrated. Assembly 30 includes temperature sensing probe 10, a support member 32, a substrate 34, and a process controller 36. Notably, temperature sensing probe 10 is disposed within a via 38 of support member 32. Sheath 20 surrounding hot end 14 of fiber optic cable 12 snugly fits within via 38. Further, retaining element 22 of temperature sensing probe 12, when removably but securely engaged, presses a terminal end of sheath 20 against substrate 34. In turn, sheath 20 forms a seal between temperature sensing element 16 and substrate 34, forms a seal along via 38, and applies compression to the temperature sensing element 16. Accordingly, at least substantially no condensate forms between temperature sensing element 16 and substrate 34. Process controller 36 includes at least an optical source 40 and optical detector 42. Process controller 36 is further in electrical communication with electrical interface 24.

Process controller 36 may further be configured to monitor and/or control a control device associated with monitoring and/or controlling a heated chamber (such as assembly 30), as described in U.S. Pat. No. 9,625,923, which is commonly assigned with the present application and the contents of which are incorporated herein by reference in their entirety.

Further, there may be multiple temperature sensing probes 10 directed over selected surfaces of substrate 34 for sensing temperature of the surfaces of substrate 34 at those locations. Similarly, there may be multiple substrates that are processed according to the present disclosure, and it is contemplated that some or all of the substrates may have corresponding temperatures sensed according to the present disclosure.

While the temperature sensing probes according to the present disclosure have been described for use in connection with at least a support member, such as an electrostatic chuck or a susceptor, it should be understood that such temperature sensing probes may be desirable for use with chamber lids, chamber baffles, edge rings, showerheads, vacuum chucks, or any other application where fiber optic temperature sensing is desirable in a vacuum and/or cryogenic environment and/or where it is desirable to prevent condensate buildup between a temperature sensing element of a hot end of a fiber optic temperature sensor and a surface of a substrate.

Unless otherwise expressly indicated herein, all numerical values indicating mechanical/thermal properties, compositional percentages, dimensions/tolerances, or other characteristics are to be understood as modified by the word "about" or "approximately" in describing the scope of the present disclosure.

It is noted that the various modules and/or circuitries (e.g., controller, microcontroller, processors, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. In such a form, a memory stores, and a processing module coupled thereto executes, operational instructions corresponding to at least some of the steps and/or functions illustrated and/or described herein.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A temperature sensing probe, comprising:
   a fiber optic cable having at a cold end an optical interface and at a hot end a temperature sensing element for contacting a substrate, wherein the temperature sensing element comprises a fluorescent material;
   an elastically deformable sheath surrounding at least a portion of the hot end of the fiber optic cable; and
   a retaining member for securely and removably engaging the elastically deformable sheath with a support member,
   wherein a vacuum seal is provided between the elastically deformable sheath and the substrate upon deformation of the elastically deformable sheath by axial compression applied by the retaining member.

2. The temperature sensing probe of claim 1 further comprising a light detector in optical communication with the optical interface.

3. The temperature sensing probe of claim 1 further comprising a light source in optical communication with the optical interface.

4. The temperature sensing probe of claim 1 further comprising a controller comprising a light detector in optical communication with the optical interface and a light source in optical communication with the optical interface, wherein the controller is configured to control the temperature of the substrate.

5. The temperature sensing probe of claim 1, wherein the elastically deformable sheath comprises silicon.

6. The temperature sensing probe of claim 1, wherein the temperature sensing probe senses the temperature of a substrate in a vacuum.

7. The temperature sensing probe of claim 1, wherein the temperature sensing probe senses the temperature of a substrate in a cryogenic environment.

8. The temperature sensing probe of claim 1, wherein the support member is an electrostatic chuck for use in semiconductor processing.

9. A temperature sensing probe, comprising:
   a fiber optic cable having at a cold end an optical interface and at a hot end a temperature sensing element for contacting a substrate, wherein the substrate comprises a fluorescent material;
   an elastically deformable sheath surrounding at least a portion of the hot end of the fiber optic cable;
   a light detector in optical communication with the optical interface;
   a light source in optical communication with the optical interface; and
   a retaining member for securely and removably engaging the elastically deformable sheath with a support member, wherein a vacuum seal is provided between the elastically deformable sheath and the substrate upon deformation of the elastically deformable sheath by axial compression applied by the retaining member.

10. The temperature sensing probe of claim 9 further comprising a controller comprising a light detector in optical communication with the optical interface and a light source in optical communication with the optical interface, wherein the controller is configured to control the temperature of the substrate.

11. The temperature sensing probe of claim 9, wherein the elastically deformable sheath comprises silicon.

12. The temperature sensing probe of claim 9, wherein the temperature sensing probe senses the temperature of a substrate in a vacuum.

13. The temperature sensing probe of claim 9, wherein the temperature sensing probe senses the temperature of a substrate in a cryogenic environment.

14. The temperature sensing probe of claim 9, wherein the support member is an electrostatic chuck for use in semiconductor processing.

15. An assembly comprising:
   a support member comprising a via;
   a substrate disposed adjacent to the support member;
   a fiber optic cable having at a cold end an optical interface and at a hot end a temperature sensing element, wherein the temperature sensing element contacts the substrate;
   an elastically deformable sheath surrounding at least a portion of the hot end of the fiber optic cable, wherein at least a portion of the elastically deformable sheath is disposed in the via; and
   a retaining member securely and removably engaging the elastically deformable sheath within the support member,
   wherein a vacuum seal is provided between the elastically deformable sheath and the substrate upon deformation of the elastically deformable sheath by axial compression applied by the retaining member.

16. The assembly according to claim 15, wherein the temperature sensing element comprises a fluorescent material.

17. The assembly according to claim 15, wherein the substrate comprises a fluorescent material at a location of the vacuum seal.

18. The assembly according to claim 15, further comprising a controller comprising a light detector in optical communication with the optical interface and a light source in optical communication with the optical interface, wherein the controller is configured to control the temperature of the substrate.

19. The temperature sensing probe of claim 15, wherein the elastically deformable sheath comprises silicon.

20. The temperature sensing probe of claim 15, wherein the temperature sensing probe senses the temperature of a substrate in a vacuum.

* * * * *